US006400179B1

United States Patent
Armstrong et al.

(10) Patent No.: US 6,400,179 B1
(45) Date of Patent: Jun. 4, 2002

(54) METHOD FOR TERMINATION OF SIGNAL LINES WITH DISCRETE BIASED DIODES

(75) Inventors: Anthony Armstrong; Matthew B. Mendelow; Scott Allen Dickey, all of Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/769,805

(22) Filed: Jan. 25, 2001

(51) Int. Cl.⁷ .......................................... H03K 19/0175
(52) U.S. Cl. ............................ 326/30; 326/86; 326/90; 333/22 R; 327/309; 327/310
(58) Field of Search ............................ 326/30, 32, 33, 326/86, 90; 333/22 R; 327/309, 310, 314, 320, 321

(56) References Cited

U.S. PATENT DOCUMENTS 5,136,187 A * 8/1992 Ceccherelli et al. ........ 307/443
5,241,643 A * 8/1993 Durkin et al. ............... 395/425
5,646,552 A * 7/1997 Ota ............................. 326/86
5,686,872 A * 11/1997 Fried et al. ................. 333/22 R

OTHER PUBLICATIONS

Systems Architecture, Stephen D. Burd, University of New Mexico, ITP 1996.*

* cited by examiner

Primary Examiner—Michael Tokar
Assistant Examiner—Vibol Tan
(74) Attorney, Agent, or Firm—Haynes and Boone, LLP

(57) ABSTRACT

Use of a variable voltage supply to clamp a diode for shunting signal glitches is described. Clamping the diode to a variable voltage supply enables forward-biasing of the diode, thereby preparing the diode for the glitch and effectively reducing the diode's turn-on time. The voltage of the variable voltage supply is determined by the size of the clamping diode used and the magnitude of the glitch it is designed to shunt. In one embodiment, the variable voltage supply is a temperature compensated voltage supply, such that as the temperature, and hence, the capacitance, of the diode changes, the value of the variable voltage supply also changes accordingly.

16 Claims, 1 Drawing Sheet

METHOD FOR TERMINATION OF SIGNAL LINES WITH DISCRETE BIASED DIODES

BACKGROUND

The disclosures herein relate generally to methods of damping undershoot of signals and, more particularly, to a method of accomplishing such damping using discrete biased diodes.

Motherboards with buses of increasing speed and chipsets of increasing complexity are constantly being developed and shipped. Often, issues occur that cannot easily be fixed with routing changes or silicon changes in the chipsets and still meet the required ship dates. For example, certain problems exist that are caused by fast and massive switching of large buses (such as memory buses), which result in glitches as energy is reflected on the line. Damping of the undershoot of some signals prevents reflection of the energy into positive glitches that can cause false signals or data corruption on these buses. Discrete solutions often cannot function fast enough to affect signals at these speeds, usually because of factors such as parasitic capacitance inherent in the packaging of such parts. Integrated silicon solutions are not always available, often because of lack of time to implement them or because the necessary parts are of an industry standard.

It has been known to use diodes to clamp signal lines to a fixed plane, either ground or voltage, to shunt off glitches into the plane. If one has the opportunity to include such diodes directly on an integrated circuit ("IC") chip itself, this technique is generally adequate, because the diodes used can be very small, low capacitance devices and therefore have a sufficiently fast "turn-on" time (i.e., the time it takes to overcome the capacitance of a diode) to shunt small, fast glitches before they are gone. However, in many situations, it is not possible to include such clamping diodes on the chip. In these situations, the diodes must be placed on the motherboard and the diodes themselves are necessarily larger, higher capacitance devices and therefore have much slower turn-on times. More often than not, the glitch that the diode is supposed to shunt comes and goes before the diode can even turn on to shunt it.

Therefore, what is needed is a method of shunting signal glitches using conventional, discrete clamping diodes.

SUMMARY

One embodiment, accordingly, uses a variable voltage supply to clamp a diode used to shunt signal glitches. Clamping the diode to a variable voltage supply enables forward-biasing of the diode, thereby preparing the diode for the glitch and effectively reducing the diode's turn-on time. The voltage of the variable voltage supply is determined by the size of the clamping diode used and the magnitude of the glitch it is designed to shunt.

In another embodiment, the variable voltage supply is a temperature compensated voltage supply, such that as the temperature, and hence, the forwardvoltage drop, of the diode changes, the value of the variable voltage supply also changes accordingly.

A principal advantage of the embodiments is that large, inexpensive and/or readily available diodes can be used to shunt small signal glitches by adjusting the voltage at which such diodes turn on. Another advantage of one of the embodiments is that it compensates for changes in temperature, such that the operation of the diode in shunting signal glitches is unaffected thereby.

DETAILED DESCRIPTION

Figure 1:
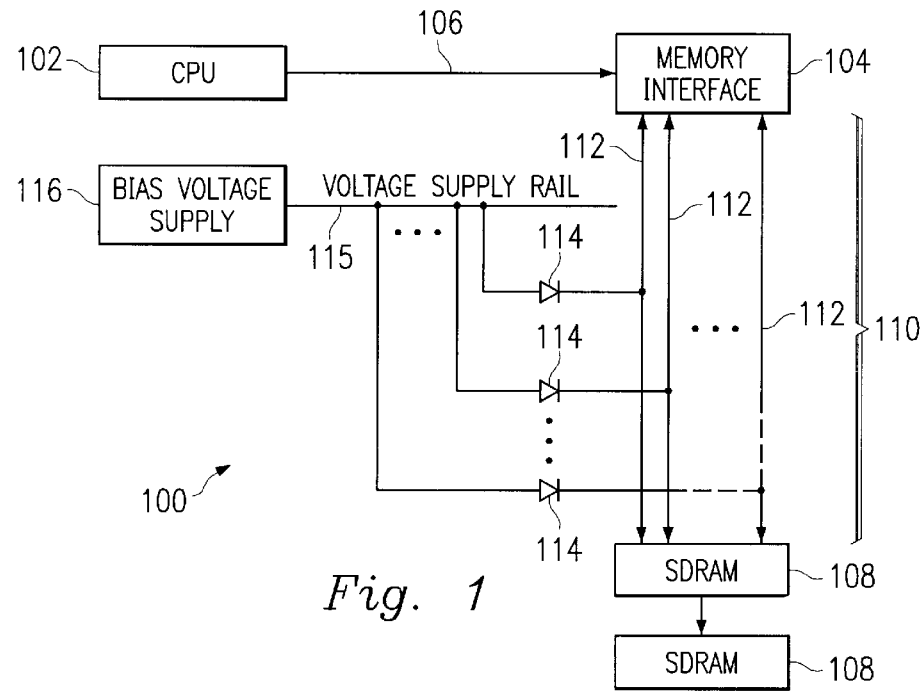
FIG. 1 is a block diagram of a portion of a computer embodying features of one embodiment.

FIG. 1 is a system block diagram of a portion of a computer mother board 100 including a central processing unit ("CPU") 102 connected to a memory interface 104 via a bus 106. The memory interface 104 is connected to SDRAM modules 108 via a memory data bus 110. In a preferred embodiment, the memory interface is implemented using a single integrated device commercially available from any of several commercial vendors, such as a North Bridge device commercially available from Intel Corporation. In the illustrated embodiment, the memory data bus 110 includes 64 data signal lines, represented in FIG. 1 by data signal lines 112.

In accordance with features of the embodiments described herein, connected to each of the data signal lines 112 is a discrete diode 114, which is clamped to a variable voltage rail 115 of a bias voltage supply 116. In the illustrated embodiment, the value of the bias voltage supply 116 is 0.5 volts, although it will be recognized that the optimum value of the bias voltage supply for any particular application will be dependent on various factors, such as the magnitude of the glitch and size and speed of the discrete diode. In the illustrated embodiment, the diodes 114 are implemented using Rohm part number DAP222.

As previously explained, clamping of the discrete diodes 114 to the variable voltage supply rail 115 forward biases the diodes such that the turn-on times thereof are faster. In operation, glitches that appear on the signal data lines 112 will be shunted by the respective diode 114 to the variable voltage supply rail 115.

Figure 2:
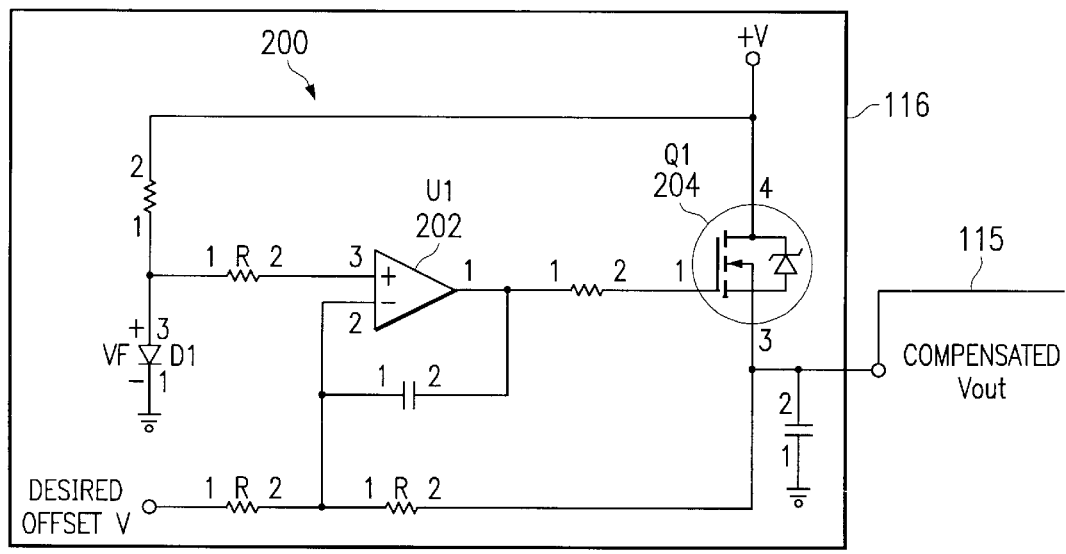
FIG. 2 is a schematic diagram of a temperature-compensated variable voltage supply for use in the embodiment of FIG. 1.

The forward voltage of the discrete diodes 114 is dependent upon temperature; therefore, in a preferred embodiment, as illustrated in FIG. 2, reference circuitry 200 of the bias voltage supply 116 allows the bias voltage to compensate for changes in ambient temperature. In particular, the circuitry 200 includes a reference diode D1, which is the same part number (and preferably from the same production run) as the diodes 114 (FIG. 1). The reference diode D1 is forward-biased to provide a voltage that closely matches the forward-voltage drop of the diodes 114. The forward voltage VF of the diode D1 will vary over temperature. A desired offset voltage is adjusted by the user to achieve maximum clamping effect for the circuit in question. The desired offset voltage is selected to be close enough to see improved clamping performance, but still allows for a margin to ensure that the diodes 114 are not forward biased except when a glitch is present. In the illustrated embodiment, an appropriate value for the desired offset voltage is 100 mV. Both the forward voltage VF of the reference diode D1 and the desired offset voltage are input to a differential amplifier 202, which in turn drives a power amplifier 204. The output of the power amplifier 204 is a voltage equal to the forward voltage $V_F$ of the reference diode D1 minus the desired offset voltage. The output voltage of the power amplifier 204 will vary as the forward voltage $V_F$ of the reference diode D1 varies over temperature and is used to feed the clamping voltage rail 115 to which the diodes 114 are tied (FIG. 1).

As can be seen, the principal advantage of the embodiments is that large, conventional diodes can be used to shunt small, fast glitches. Another advantage of one of the embodiments is that it compensates for changes in temperature, such that the operation of the diode in shunting signal glitches is unaffected thereby.

In particular, the embodiments described herein enable a developer to use inexpensive, readily available diodes to shunt high-speed glitches by adjusting the voltage at which the diodes turn on. With very high-speed signals, such as memory bus signals, the embodiments also cause the diodes to turn on earlier in the signal undershoot, depending on the slew rate of the signal. This earlier response makes the parasitic reactance of the discrete diode component less of a factor and allows the diode to affect and damp signals that would otherwise occur too quickly for the device to turn on. In addition, by biasing the diode, ideally with an isolated power plane to prevent noise injection, the amount of energy that is dissipated into the diode can be controlled. This in turn enables the thermal effects on the diodes to be controlled and a tradeoff to be made between the amount of damping on the undershoot that the diode can affect and how much energy goes through the diode (which will affect the diode's reliability and potentially the reliability of the board).

Additionally, because the discrete diode's forward voltage is dependent upon temperature, using the temperature-compensated variable voltage supply described above allows the bias voltage to compensate for changes in ambient temperature.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and. in a manner consistent with. the scope of the embodiments disclosed herein.

What is claimed is:

1. A method of shunting a signal glitch on a signal line, the method comprising:
   electrically connecting a discrete diode to the signal line;
   forward-biasing the discrete diode;
   wherein the signal glitch is shunted by the discrete diode to a bias voltage plane, the forward-biasing comprising clamping the discrete diode to the bias voltage plane, wherein a voltage of the bias voltage plane is sufficient to forward bias the discrete diode; and
   varying the voltage of the bias voltage plane in accordance with a temperature of the discrete diode, wherein the varying comprises providing in feedback loop of a voltage supply for supplying the voltage of the bias voltage plane including a reference diode identical to the discrete diode.

2. The method of claim 1 wherein the discrete diode turns on sufficiently fast to shunt the signal glitch.

3. The method of claim 1 wherein the varying further comprises deriving the voltage of the bias voltage plane by subtracting a forward voltage of the reference diode at a given temperature from a desired offset voltage selected by a user.

4. Apparatus for shunting a signal glitch on a signal line, the apparatus comprising:
   a discrete diode electrically connected to the signal line;
   means for forward-biasing the discrete diode;
   wherein the signal glitch is shunted by the discrete diode to a bias voltage plane, the means for forward-biasing comprising clamping the discrete diode to the bias voltage plane, wherein a voltage of the bias voltage plane is sufficient to forward bias the discrete diode; and
   means for varying the voltage of the bias voltage plane in accordance with a temperature of the discrete diode, wherein the varying comprises a feedback loop of a voltage supply for supplying the voltage of the bias voltage plane including a reference diode identical to the discrete diode.

5. The apparatus of claim 4 wherein the discrete diode turns on sufficiently fast to shunt the signal glitch.

6. The apparatus of claim 4 wherein the means for varying further comprises means for deriving the voltage of the bias voltage plane by subtracting a forward voltage of the reference diode at a given temperature from a desired offset voltage selected by a user.

7. Apparatus for shunting a signal glitch on a signal line, the apparatus comprising:
   a clamping diode connected to the signal line for shunting the signal glitch; and
   a bias voltage supply for forward-biasing the clamping diode, the bias voltage supply including a feedback loop comprising a reference diode identical to the clamping diode;
   wherein the clamping diode shunts the signal glitch to a voltage plane supplied by the bias voltage supply.

8. The apparatus of claim 7 wherein a voltage of the bias voltage supply is sufficient to forward-bias the clamping diode such that the clamping diode turns on sufficiently fast to shunt the signal glitch.

9. The apparatus of claim 7 wherein a voltage of the bias voltage supply is temperature-dependent.

10. The apparatus of claim 7 wherein the bias voltage supply comprises:
    the reference diode having a forward voltage $V_F$; and
    a comparator connected to subtract $V_F$ from a desired offset voltage selected by a user.

11. A computer comprising:
    a central processing unit ("CPU");
    a memory controller connected to the CPU;
    a memory complex connected to the memory controller via a memory bus, the memory bus comprising a plurality of signal lines; and
    means for shunting signal glitches appearing on the signal lines, the means comprising:

for each of the signal lines, a clamping diode connected to the signal line for shunting signal glitches; and a bias voltage supply for forward-biasing the clamping diode, the bias voltage supply including a feedback loop comprising a reference diode identical to the clamping diode;

wherein, for each of the signal lines, the clamping diode shunts signal glitches to a voltage plane supplied by the bias voltage supply.

12. The computer of claim 11 wherein a voltage of the bias voltage supply is sufficient to forward-bias the clamping diode such that the clamping diode turns on sufficiently fast to shunt the signal glitch.

13. The computer of claim 11 wherein a voltage of the bias voltage supply is temperature-dependent.

14. The computer of claim 11 wherein the bias voltage supply comprises:

the reference diode having a forward voltage $V_F$; and a comparator connected to subtract $V_F$ from a desired offset voltage selected by a user.

15. Apparatus for shunting a signal glitch on a signal line, the apparatus comprising:

a clamping diode connected to the signal line for shunting the signal glitch;

a bias voltage supply for forward-biasing the clamping diode;

wherein the clamping diode shunts the signal glitch to a voltage plane supplied be the bias voltage supply;

the bias voltage supply comprising:

a reference diode identical to the clamping diode and having a forward voltage $V_F$; and a comparator connected to subtract $V_F$ from a desired offset voltage selected by a user.

16. A computer comprising:

a central processing unit ("CPU");

a memory controller connected to the CPU;

a memory complex connected to the memory controller via a memory bus, the memory bus comprising a plurality of signal lines; and means for shunting signal glitches appearing on the signal lines, the apparatus comprising:

for each of the signal lines, a clamping diode connected to the signal line for shunting signal glitches;

a bias voltage supply for forward-biasing the clamping diode;

wherein, for each of the signal lines, the clamping diode shunts signal glitches to a voltage plane supplied by the bias voltage supply;

the bias voltage supply comprising:

a reference diode identical to the clamping diode and having a forward voltage $V_F$; and a comparator connected to subtract $V_F$ from a desired offset voltage selected by a user.

* * * * *